April 11, 1961     H. R. KARLEN     2,979,597
VARIABLE CONTROL SWITCH
Filed June 26, 1957
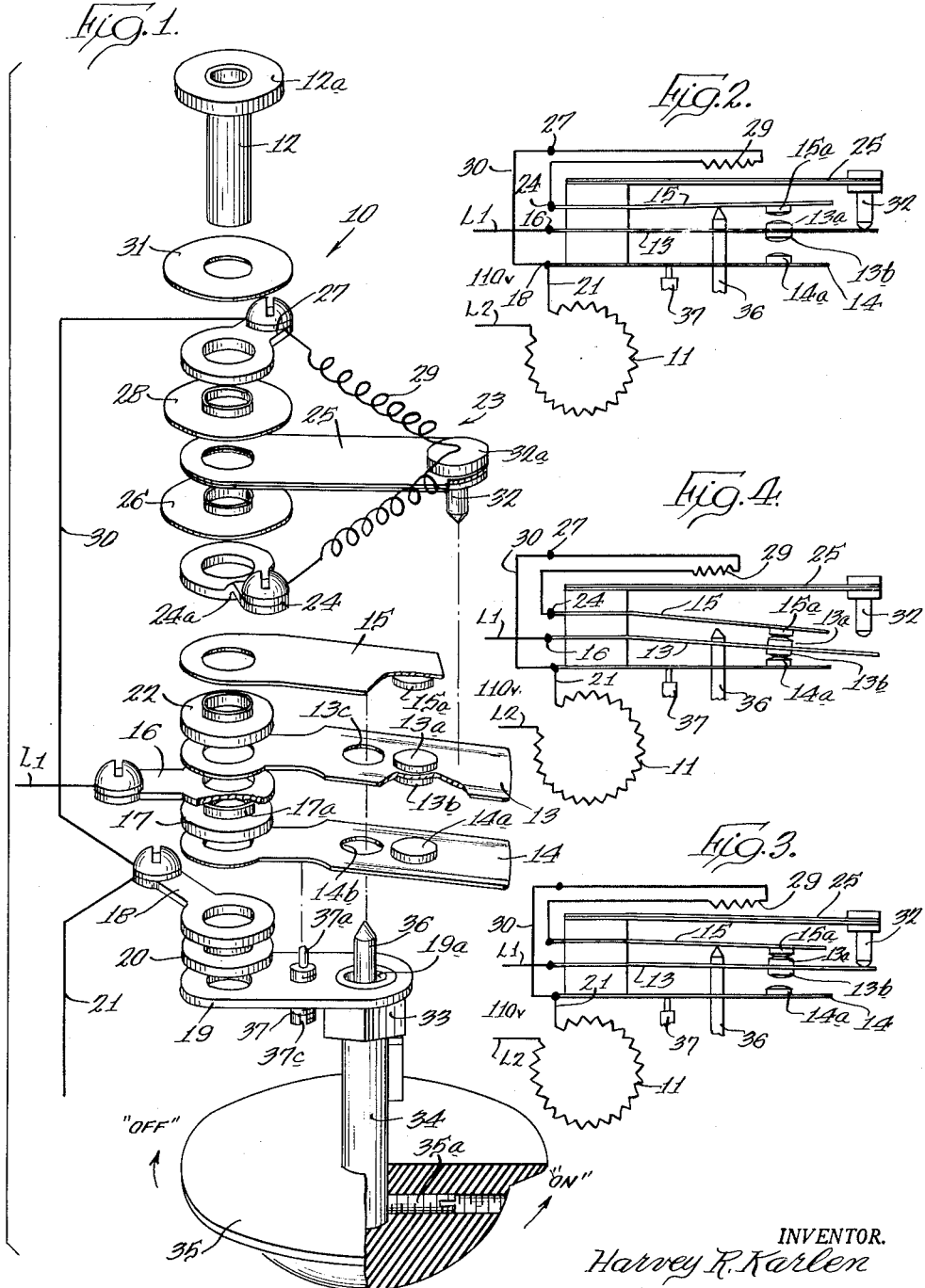
INVENTOR.
Harvey R. Karlen

United States Patent Office 2,979,597
Patented Apr. 11, 1961

2,979,597

VARIABLE CONTROL SWITCH

Harvey R. Karlen, Chicago, Ill., assignor to Cory Corporation, a corporation of Delaware Filed June 26, 1957, Ser. No. 668,149

8 Claims. (Cl. 219—20)

This invention relates to an adjustable electrical device and in particular to a variable switch as used in such a device for controlling the energization thereof.

In devices such as beverage brewing and maintaining appliances, it is desirable to provide means for heating a liquid such as water to a high temperature and means for maintaining the liquid at a relatively lower temperature for a substantial period of time. Illustratively, in the brewing of coffee the heating means may first be employed to raise the temperature of the water in a brewing container to the boiling point whereby the brewing is effected. Subsequently, the heating means may maintain the prepared coffee in a suitable decanter at a temperature of approximately 190° F. until it is served.

A common heating means for this purpose comprises an electrical heating coil, suitable control means being associated with the heating coil to effect the desired temperature of the liquid.

The principal object of this invention is to provide a new and improved control means for regulating the energization of an electrical device such as a heating coil.

Still another object is to provide a new and improved control means wherein means are provided for effecting a series of on and off conditions to regulate the heating effect of the heating means.

A further object is to provide a new and improved control means having electrically operative means for effecting the on and off conditions, which means are connected in series relationship with the heating means for automatic correlation of the duration of the on condition with the heating requirement notwithstanding variations in the power supply voltage.

Still another object is to provide such a control means which comprises a variable switch utilizing a bimetallic element for controlling the durations of the on and off conditions.

A further object is to provide such a switch wherein the means for operating the bimetallic strip element is actuated by a heater in series electrical relationship with the heating means.

A still further object is to provide such a switch wherein the bimetallic strip and heater are arranged in a novel manner minimizing residual heating effects.

Still another object is to provide such a switch having a pair of contacts in series with the heating means and bimetallic strip heater and operable by the bimetallic strip with means for affecting the relationship of the contact elements to regulate the integrated amount of energization of the heating means.

A yet further object is to provide such a switch having means for shorting out the regulating means when desired, thereby to cause the heating means to be energized continuously while allowing the heater to be inoperative, thereby to increase the life of the heater structure.

Yet another object is to provide a new and improved adjustable switch having means continuously translatable to provide an "Off" function, a "Continuous On" function, and a "Regulating On" function, said "Regulating On" function being obtained over substantially the entire range of adjustment of the switch.

Other features and advantages of this invention will be apparent from the following description taken in connection with the accompanying drawings wherein:

Fig. 1 is an exploded isometric view of a switch embodying the invention with portions thereof broken away;

Fig. 2 is a schematic elevational view thereof as arranged in the "Off" condition;

Fig. 3 is a schematic elevational view thereof as arranged in the "Regulating On" condition; and Fig. 4 is a schematic elevational view thereof as arranged in the "Continuous On" condition.

In the exemplary embodiment of the invention as disclosed in the drawings, a control switch generally designated 10 is electrically associated with an electrical device such as heating means or coil 11 to control the energization of the heating means from a suitable electrical power source (not shown) through supply lines L1 and L2. Switch 10 is adjustable to effect three conditions of operation of the heating means. In the first condition, herein termed the "Off" condition, the switch effects a discontinuation of energization of the heating means by breaking the feed to the heating means from line L1. In the second condition herein termed the "Regulating On" condition, the switch effects a repeated discontinuous energization (sequentially On and Off) of the heating means to provide a predetermined heating effect thereof. The relative period of time during which the heating element is energized (On) relative to the period of time in which it is de-energized (Off) in this second condition, is adjustable over a predetermined range. In the third condition, herein termed the "Continuous On" condition, the switch maintains the heating means continuously energized. It is one of the prime features of the invention that the switch is arranged so that the second condition is obtained over substantially the entire range of movement of the switch operating means. Thus increased accuracy in the regulation is obtained.

Illustratively, where the heating means 11 comprises means for brewing and maintaining a beverage, the "Off" condition is effected normally when the means is not in use. When it is desired to boil a liquid such as water in the preparation of the beverage, the switch is placed in the "Continuous On" condition wherein the heating element is continuously energized until the liquid reaches the boiling temperature. Subsequent to the preparation of the beverage, it may be desired to maintain the beverage at a lower temperature (such as 150° F. for hot chocolate, or 190° F. for coffee) and the switch is adjusted to cause the device to function in the "Regulating On" condition.

The instant invention comprehends the provision of a thermostat control means operative under the "Regulating On" condition to effect the necessary repeated opening and closing of the switch. The control means is arranged in series electrical relationship with the heating coil 11 to vary the duration of the "On" condition in accordance with the quantity of heat developed in the heating coil by the electrical power. Thus, should the power supply voltage decrease resulting in a decrease in the rate of heat output of coil 11, the control means automatically compensates by maintaining the "On" condition for a relatively longer period of time. To increase the accuracy of temperature adjustment obtainable with the switch, a novel thermostat means is employed which substantially eliminates residual heat effects which tend to reduce the accuracy and sensitivity of the conventional thermostat devices, it being understood that the invention comprehends such a switch device wherein the "On" and "Off" conditions are obtained by other suitable means.

Referring now more specifically to Fig. 1, switch 10 is seen to comprise a rod support 12 on which is mounted a plurality of resilient, electrically conductive blade elements including a middle blade element 13, a first outer or lower blade element 14, and a second outer or upper blade element 15. A terminal 16 is mounted on support 12 in electrical connection with middle blade 13 and spaced from lower blade element 14 by means of insulating washer 17. A second terminal 18 is mounted on support 12 in electrical connection with the lower blade element 14 and is spaced from a fixed plate 19 by an insulating washer 20. As shown, supply line L1 is electrically connected to terminal 16, and a jumper 21 electrically connects heating means 11 with terminal 18. Support 12 comprises a steel rod and the different conductive elements of the switch are insulated therefrom by means of annular projections on the adjacent washers or spacers, such as projection 17a on washer 17. To retain the switch elements mounted thereon the lower end of the rod may be enlarged as by swaging.

Upper blade element 15 is spaced from middle blade element 13 by means of an insulating washer 22 mounted therebetween on support 12. Middle blade 13 is biased upwardly whereby the middle blade tends to be spaced above lower blade 14. However, upper blade element 15 is biased downwardly to have a contact 15a thereon normally abut an upper contact 13a on middle blade 13. The biasing effect of blade 15 is made sufficient to overcome the upward bias of middle blade element 13 and urge it downwardly to cause a lower contact 13b thereon to abut a contact 14a on the lower blade element 14. As will be described more fully hereafter, means are provided to regulate the positioning of upper blade 15 to vary the above described relationships with the other blade elements.

The thermostatic control means generally designated 23 comprises a lower terminal 24 mounted on support 12 in electrical connection with upper blade element 15. A bimetallic strip element 25 is mounted above terminal 24 on support 12 and is spaced therefrom by an insulating washer 26. An upper terminal 27 is mounted on the support 12 above the bimetallic strip 25 and is spaced therefrom by an insulating washer 28. Connected across terminals 24 and 27 is a heater 29 illustratively shown as a resistance wire coil. A jumper 30 is connected between terminals 27 and 18 to connect one side of the heater through jumper 21 to the heating means 11. If desired, a mica spacer 31 may be mounted on the support 12 above terminal 27 to space terminal 27 from a radially enlarged head 12a at the upper end of the rod support.

At its outer end, bimetallic strip 25 carries a pin 32 of insulating material which projects downwardly to engage middle blade element 13. To permit this engagement, the upper blade element 15 is made shorter than the middle blade element so that the pin may pass freely the outer end of the upper blade.

Heater coil 29, as discussed above, is arranged to effect operation of bimetallic strip 25 with minimal residual heat effect. The heater coil is arranged to extend generally adjacent bimetallic strip 25 and between terminals 24 and 27, the mid-portion thereof being connected to strip 25 by means of a support 32a projecting from strip 25. Support 32a is preferably of relatively small size, thus only a small quantity of heat may be residual therein subsequent to a discontinuation of energization of coil 29. In the illustrated embodiment, support 32a is disposed at the outer end of strip 25 and heater coil 29 extends substantially parallel to and adjacently above strip 25 to transfer heat to the strip substantially only by radiation, thus minimizing residual heat effects thereof.

Manually operable means are provided for adjusting the biasing and positioning of the blade elements to effect the three different conditions of the switch described above. These means are seen to comprise a screw member or nut 33 secured to fixed blade 19 in alignment with an opening 19a through the blade. A stem 34 is threaded at one end for association with nut 33 and a handle 35 is secured at the other end of the stem, by suitable means such as screw member 35a. Rotation of the stem by the handle effects longitudinal movement of the stem relative to fixed blade 19. Projecting through opening 19a from stem 34 is an operating rod 36 which passes freely through an opening 14b in lower blade element 14 and an opening 13c in the middle blade element 13 to engage the underside of the upper blade element 15 when the rod is in a longitudinally upper position. In the illustrated switch, 360° rotation of handle 35 effects the complete longitudinal movement of rod 36 between an upper ("Off" condition) position and a lower ("Continuous On" condition) position. Nut 33 is provided with a left-hand thread, thus clockwise rotation of handle 35 (as seen in Fig. 1) causes rod 36 to be extended or moved upwardly, and conversely clockwise rotation of the handle causes the rod to be retracted or moved downwardly. It should be noted however that handle 35 will ordinarily be disposed for manipulation with stem 34 extending away from the operator and thus the directions of rotation of handle 35 as seen in Fig. 1 are opposite to the directions of rotation of the handle relative to the operator.

Also mounted on fixed blade 19 is a means for adjusting the positioning of lower blade element 14. This means is seen to comprise a stud 37 threadedly mounted on the fixed blade 19 for vertical movement. At its upper end the stud is provided with a pin 37a arranged to engage the underside of lower blade element 14. To permit adjustment of the longitudinal positioning of stud 37, a slot 37c may be provided in the lower end of the stud for engagement by a suitable tool such as a screw driver.

Referring now more specifically to Figs. 2 through 4, the functioning of switch 10 may be seen. As seen in Fig. 2, in the "Off" condition, handle 35 is rotated to an extreme clockwise position whereby operating rod 36 is extended through blades 13 and 14 to move upper blade 15 upwardly from the middle blade and space contact 15a from contact 13a. This breaks the circuit from line L1 to the heater 29 and, as the heater is in series with heating means 11 through jumpers 30 and 21, prevents energization of the heating means. It should be noted that the upward disposition of blade 15 allows the bias of middle blade 13 to cause the middle blade to be spaced substantially above the lower blade.

Referring now more specifically to Fig. 4, should it be desired to effect a continuous energization of the heating means 11, handle 35 is rotated to an extreme counterclockwise position (substantially 360° from the "Off" position) thereby withdrawing rod 36 from engagement with upper blade 15 and allowing the upper blade to move downwardly and overcome the upward bias of blade 13 until contact 13b of the middle blade engages contact 14a of the lower blade. Thus, electrical energy now flows from terminal 18, through blade 14, across contacts 14a—13b, through blade 13 to terminal 16, and thence to supply line L1 in a completed circuit from supply line L2 to the heating means 11.

Referring now to Fig. 3, it may be seen that the "Regulating On" condition is effected by rotating handle 35 to a position intermediate the extreme positions of 2 and 4, whereby rod 36 may bear against the lower side of upper blade element 15 while allowing the upper blade element to remain sufficiently close to the middle blade 13 so that contacts 13a and 15a remain in engagement. As the "Off" condition and "Continuous On" condition may be effected with a minimum movement of the handle 35, illustratively 5° respectively, the "Regulating On" condition may be obtained over a substantial portion of the movement of the handle, i.e. approximately 350°. Such disposition of rod 36 establishes a circuit from terminal 16, through middle blade 13, across contacts 13a—15a, through upper blade 15, through heater 29, through jumpers 30 and 21, and to heating element 11. Heater 29 heats up substantially immediately and transfers heat energy to bimetallic strip 25 which reacts by bending downwardly to move pin 32 against middle blade 13 until contact 13a thereon is spaced from contact 15a on the upper blade 15. This opens the previously established circuit to deenergize heater 29 and heating element 11.

It may be seen that the amount of bending of bimetallic strip 25 which effects this spacing of contacts 13a and 15a is dependent upon the positioning of operating rod 36 which holds the upper blade element 15 against moving downwardly. Thus, if it is desired to produce a substantial amount of heat in heating means 11, rod 36 is positioned in a relatively lower position so that a substantial movement of bimetallic strip 25 is necessary before it causes disassociation of contact 13a from contact 15a. If a relatively small amount of heat energy is desired from means 11, the rod is positioned relatively upwardly so that a smaller downward movement of middle blade 13 by means of pin 32 is sufficient to separate contacts 13a and 15a. As the means for heating strip 25 is arranged to have minimal residual heat effect, once the heater is deenergized, the bimetallic strip may return to its unbent position rapidly.

Thus, the variable positioning of rod 36 provides a variable control over the heating effect of heating means 11. Illustratively, the rod may be arranged to correlate the bimetallic strip functioning with the characteristics of the heating means so that a temperature range of 150° F. to 190° F. may be obtained, suitable for maintaining such differing beverages as hot chocolate (requiring approximately 150° heat) and coffee (requiring approximately 190° heat). The upper temperature limit is, of course, controlled by the pin 37a. Thus, an upward disposition of the pin causes blade 14 to be disposed upwardly so that less retraction of rod 36 is required to permit blade 15 to urge blade 13 sufficiently downwardly to close contacts 13b—14a. As the "Regulating On" operation of pin 36 requires a spacing of blades 13 and 14, such adjustment of blade 14 which causes a decrease in the allowable movement of blade 13 effects a lowering of the upper end of the temperature range controllable by the thermostatic means.

As discussed above, heater 29 is in series electrical relationship with the heating means 11. Thus, any variation in the voltage provided from the power source which results in a lower rate of heating production in heating means 11 also results in a lower rate of heat production in heater 29. As a result, contacts 15a and 13a are correspondingly allowed to remain closed for a longer period, automatically compensating for the decreased rate of heat production in means 11. Conversely where the impressed voltage is above normal, the increased rate of production of heat by heating means 11 is automatically compensated by the increased heating effect of heater 29 to open the contacts 15a and 13a more quickly.

It should also be noted that because of the novel association of lower blade 14 with middle blade 13 the heater 29 is shorted out when it is desired to maintain heating element 11 continuously energized. Thus the heater may remain inoperative and cool during the entire time the high heat "Continuous On" condition prevails, thereby substantially extending the life of the heater and the associated elements.

Through substantial elimination of residual heat effects in the means for heating the bimetallic strip, a fast acting, accurately controllable thermostat regulation is obtained. A high-efficiency, high-temperature heater may be employed such as one operating in the range of 400° F.–500° F., while yet allowing a rapid return of the bimetallic strip to the cool, unbent position.

While the illustrated embodiment of the invention relates to a beverage heating means control, it is obvious that the control switch may be utilized satisfactorily with other electrical devices requiring a regulated energization. The specific adjustments and relationships of the elements may be so correlated with the requirements of the associated electrical device as to effect a desired controlled operation thereof.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A regulating switch comprising: three laterally spaced blades formed of resilient, electrically conductive material; contact means on said blades arranged so that the middle blade may have alternative electrical connection with either of the outer blades, said middle blade being biased to contact one outer blade; a bimetallic strip having means thereon for engaging said middle blade; heater means associated with the bimetallic strip to heat said strip and cause the means thereon to counteract the biasing of the middle blade and urge the middle blade away from said one outer blade, said one outer blade being biased to contact the middle blade and counteract the biasing of the middle blade to urge it into contact with the other outer blade; and rod means alternatively positionable to engage said one outer blade to limit the biasing thereof precluding an urging of the middle blade into contact with said other outer blade and permit connection of said one outer blade to said middle blade to be controlled by said means on said strip, and to permit the biasing of said one outer blade to effect electrical connection of the middle blade with said other outer blade.

2. A variable switch comprising: three laterally related blades formed of resilient, electrically conductive material, including a middle blade biased away from a first outer blade and a second outer blade biased toward the middle blade to have electrical connection therewith; a rod engageable with the second outer blade to limit the movement thereof toward the middle blade when desired; means selectively positionable to urge the middle blade, against the bias thereof, toward the first outer blade; and means for adjusting the positioning of the first outer blade to a position wherein the second outer blade maintains the middle blade in electrical contact with the first outer blade when said rod is disengaged from the second outer blade, irrespective of the position of the means urging the middle blade against the bias thereof.

3. A variable switch comprising: three laterally related blades formed of resilient, electrically conductive material, including a middle blade biased away from a first outer blade and a second outer blade opposite said first outer blade and biased toward the middle blade to have breakable electrical connection therewith; a rod adjustably translatable to limit the movement of the second outer blade toward the middle blade when desired; means selectively positionable to urge the middle blade, against the bias thereof, toward the first outer blade; and means for adjusting the positioning of the first outer blade to a position wherein the second outer blade maintains the middle blade in electrical contact with the first outer blade at all times when said rod is adjusted to permit maximum movement of the second outer blade.

4. In a control switch having breakable contact elements, means for breaking the elements, comprising: an elongated bimetallic strip secured at one end to a support; means for delivering heat energy to said strip for causing said strip to bend, including a flexible heater spaced a small distance from said strip and generally of a U-shaped configuration, the closed end portion thereof being connected to a portion of the strip spaced from said one end; means on the support for fixedly retaining the legs of the coil at the end opposite said closed end, whereby said coil is caused substantially to maintain its spacing from the strip notwithstanding a bending of said strip; and means associated with said strip at the other end for movement with said other end when said strip is bent to break the contact elements.

5. A control switch comprising: a manually operable element rotatable from a first position to a final position; operating means associated with said element to be translated as an incident of the rotation of the element; first switch means biased towards a closed condition, held open by said operating means when said element is in the first position and allowed to close when said operating means is translated by more than several degrees rotation of said element from said first position; second switch means closed at all times when said element is in the final position and caused to be held open by said operating means when said element is rotated several degrees from said final position; and electrically operated means controlled by said first switch means to effect repeated opening and closing thereof only when the element is rotated more than said several degrees away from said first and final positions respectively, said second switch being connected in parallel with said electrically operated means for shorting out the same whenever said second switch is closed.

6. A control switch comprising: a manually operable element rotatable from a first position to a final position; operating means associated with said element to be translated as an incident of the rotation of the element; first switch means biased toward a closed condition, held open by said operating means when said element is in the first position and allowed to close when said operating means is translated by more than approximately 5° rotation of said element from said first position; second switch means closed at all times when said element is in the final position and caused to be held open by said operating means when said element is rotated over approximately 5° from the final position; and electrically operated means controlled by said first switch means to effect controlled opening and closing thereof when the element is rotated more than said approximately 5° away from said first and final positions respectively, said second switch being connected in parallel with said electrically operated means for shorting out the same whenever said second switch is closed.

7. A beverage brewing and maintaining device comprising: an electrically operable heating means; a manually operable handle rotatable 360° from a first position to a final position; an operating rod associated with said handle to be longitudinally translated as an incident of the rotation of the handle; first switch means biased toward a closed condition, held open by said operating rod when said handle is in the first position and allowed to close when said operating rod is translated by more than 5° rotation of said handle from said first position; second switch means closed at all times when said handle is in the final position and caused to be held open by said operating rod when said handle is rotated more than 5° from the final position; means connecting said first switch in series electrical relationship with said heating means; thermostatic means operably associated with said first switch means to effect repeated opening and closing thereof when the element is rotated more than said several degrees away from said first and final positions respectively; and means connecting said second switch in parallel electrical relationship with said thermostatic means.

8. A variable switch for controlling the energization of an electrical device, comprising: a heating element; first switch means in electrical series relationship with the heating element, said heating element and switch means being arranged for connection in electrical series relationship with the electrical device; means biasing said switch means closed; means responsive to heat energy from said heating element to open said switch means; second switch means in electrical parallel relationship with the series connection of the heating element and first switch means; and manually operable means adjustable to a first position to close said second switch means at all times while said manually operable means is adjusted to said first position thereby to short out the first switch and heating element to render said heating element inoperative while permitting continued operation of the electrical device, said manually operable means being adjustable to another position to maintain said first and second switches concurrently continuously open.

References Cited in the file of this patent

UNITED STATES PATENTS

| | | |
|---|---|---|
| 2,199,638 | Lee | May 7, 1940 |
| 2,350,148 | Bostwick | May 30, 1944 |
| 2,741,682 | Schwaneke et al. | Apr. 10, 1956 |
| 2,753,437 | Mertler | July 3, 1956 |
| 2,788,415 | Payne | Apr. 9, 1957 |
| 2,790,056 | Fry | Apr. 23, 1957 |
| 2,798,929 | Wojcik | July 9, 1957 |
| 2,804,524 | Dahlen | Aug. 27, 1957 |
| 2,805,302 | Reis | Sept. 3, 1957 |